July 20, 1971 R. SCHÄFER 3,594,300
APPARATUS FOR INDICATING AND ELIMINATING SHORT CIRCUITS
IN THE CELLS OF ELECTROLYSIS PLANTS
Filed July 19, 1968
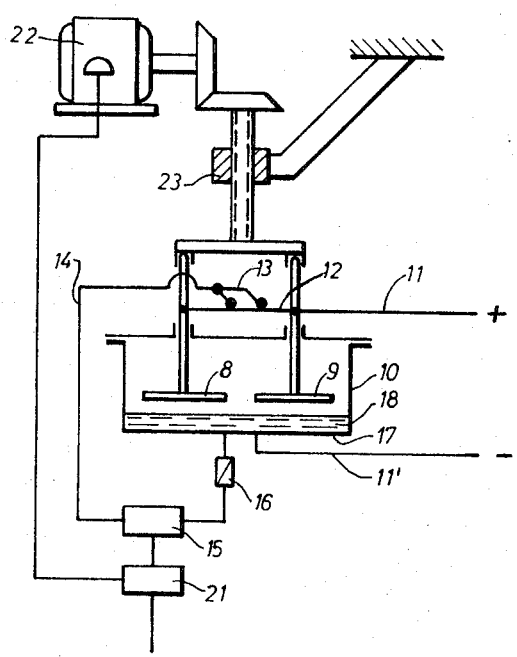
INVENTOR.
ROLF SCHÄFER
BY:

3,594,300
APPARATUS FOR INDICATING AND ELIMINAT-
ING SHORT CIRCUITS IN THE CELLS OF ELEC-
TROLYSIS PLANTS
Rolf Schafer, Krefeld-Urdingen, Germany, assignor to
Farbenfabriken Bayer Aktiengesellschaft, Leverkusen,
Germany
Filed July 19, 1968, Ser. No. 746,118
Claims priority, application Germany, Aug. 1, 1967,
P 16 17 431.1
Int. Cl. B32p 1/14; B01k 3/00
U.S. Cl. 204—225          1 Claim

ABSTRACT OF THE DISCLOSURE

Improvements in the operation of an electrolytic cell and/or a battery of such cells such as set forth in application Ser. No. 660,815, filed Aug. 15, 1967, wherein the switch means of a circuit activates a relay means which in turn activates a motor means which functions to adjust the gap or distance between the anode and the cathode of such electrolytic cell and which device and circuit may also contain means for measuring when the anode and cathode have a short circuit therebetween whereby activating the switch means and means for detecting the opening of the short circuit so as to control the motor and adjusting means thereby.

A known process and an apparatus includes means for indicating the presence of short circuits in the cells of electrolysis plants, particularly for the electrolysis of alkali metal chlorides, in which the individual cells or anodes are connected to current feeds, arranged near which are ferromagnetic armatures provided with elastic restoring elements.

Any short circuits that occur may be visually detected at their location. In one particular embodiment of this known invention, the ferromagnetic armature acts as a switch or make contact for a checking circuit provided with an alarm device.

It has now been found in accordance with the present invention that such a ferromagnetic armature may be used as a make contact in an auxiliary circuit for operating the servomotor of an electrode adjustment mechanism. As a result, a short circuit can be automatically eliminated. As a rule, the anodes of a cell may be adjusted, either individually or together, by means of an adjustment mechanism. The present invention can be employed in conjunction with any known type of adjustment mechanism. The adjustment mechanism itself is not the subject of the invention. Although, in principle, a mercury cathode can be adjusted, it is difficult to adjust in practice. Naturally, the armature may also act simultaneously as the make contact of a checking circuit provided with an alarm device to give the operator a more effective means of monitoring the plant.

Short circuits are often caused by pieces of carbon dropping off the anodes, becoming wedged between the bottom of the cell and the anode. In one particular embodiment of the invention, therefore, the gap between the electrodes is with advantage made wider than is necessary for eliminating the short circuit, after which it is reduced again. There is preferably a time interval between widening and reducing of the gap. Any pieces of carbon which have dropped off, can then float away under the anodes.

For example, the operating cycle is completed as follows:

In the event of a short circuit, the motor by which the anodes are adjusted is driven in the direction of rotation in which the gap is widened for as long as the auxiliary circuit is closed, i.e. for as long as the short circuit exists. Once the short circuit has been eliminated, adjustment of the anodes stops. An alarm indicates the cell affected whose required voltage may subsequently be adjusted by manual actuation of the motor switch.

In another embodiment of the process according to the invention, the auxiliary circuit closed by a short circuit generates only the triggering impulse for widening the gap between the electrodes, whilst the anodes are moved further, for example under the control of a time relay, than experience has shown to be necessary for eliminating the short circuit. If the short circuit was caused by a foreign body floating on the mercury, the foreign body may float away unimpeded, particularly if their is a time interval of a few minutes before subsequent readjustment of the position of the anode.

Readjustment may be carried out manually, although it may also be automatically effected by driving the motor of the adjustment mechanism in the opposite direction of rotation for the same or for a different period of time.

In a particularly advantageous embodiment of the invention the electrodes are preferably automatically readjusted by bringing them together until the cell is short-circuited, moving them apart again and then readjusting them by reducing the gap at certain time intervals. This can be done, for example, by arranging for a time switch to generate the triggering impulse for readjusting the electrodes or anodes at adjustable time intervals. The gap between the electrodes is reduced until the cell is short-circuited. The short circuit is then eliminated, followed by readjustment as in the other embodiments.

One embodiment of the invention is described below with reference to the accompanying drawing.

Anodes 8 and 9 of a cell 10 are connected by means of a rail 12 to a conductor rail 11. Arranged above the rail 12 is an armature 13 connected with a relay 15 through a lead 14 which is connected to the base 17 of the cell 10 through a fuse 16. A conductor rail 11' leads from mercury cathode 18 to the next cell. The relay 15 serves a time switch 21 suitably designed in dependence upon the required operations to be carried out. The switch 21 operates a motor 22 driving an anode adjusting mechanism 23. It is of course also possible to operate the auxiliary circuit with any external voltage rather than with the cell voltage.

What is claimed is:

1. In an electrolytic cell comprising a multiplicity of anodes, bus bar means connected to said anodes, electrical power means connected to said anodes through said bus bar and switch means disposed proximate to said bus bar in the vicinity of electrical connection from said bar to each of said anodes which switch means comprises a conductive contact member attached to a conductive leaf spring member through a ferro-magnetic element wherein the spring strength of said leaf spring is sufficient to resist bending thereof by attraction of said ferro-magnetic element to said bus bar during passage of normal current quantities through said bus bar but insufficient to resist bending caused by the attraction of said ferro-magnetic element by said bus bar on the occasion of increased current passing through said bus bar because of a short circuit in said electrolytic cell between said anode and the cathode thereof; and alarm circuit means electrically connected across said conductive leaf spring and said bus bar activated by contact between said graphite member and said bus bar caused by bending said spring because of said sort circuit; the improvement which comprises relay means activated by said switch means, motor means activated by said relay means and means for adjusting the distance between said anode and said cathode activated by said motor means; wherein said adjusting means is adapted to move said anode and said cathode alternately farther apart or closer together; wherein upon said short circuit occurring said adjusting means moves said anode and said cathode farther apart until said short circuit is interrupted and said switch means opens.

References Cited
UNITED STATES PATENTS

| | | | |
|---|---|---|---|
| 3,396,095 | 8/1968 | Van Diest et al. | 204—225 |
| 3,480,528 | 11/1969 | Clement | 204—225X |

HOWARD S. WILLIAMS, Primary Examiner

D. R. VALENTINE, Assistant Examiner

U.S. Cl. X.R.

204—228, 250